Jan. 17, 1950     J. JOURNEL     2,494,879
APPARATUS FOR PROJECTING SUNLIGHT ONTO PUBLIC
EXHIBITS AND ADVERTISING SUBJECTS
Filed May 29, 1947

INVENTOR
JACQUES JOURNEL

By *Robert E. Burns*

ATTORNEY

Patented Jan. 17, 1950

2,494,879

UNITED STATES PATENT OFFICE 2,494,879

APPARATUS FOR PROJECTING SUNLIGHT ONTO PUBLIC EXHIBITS AND ADVERTISING SUBJECTS

Jacques Journel, Paris, France

Application May 29, 1947, Serial No. 751,198
In France June 17, 1946

5 Claims. (Cl. 88—25)

The invention relates to apparatus intended to exhibit to public view, in places untouched by sunlight, certain subjects for publicity, all useful indications, or advertisements, by illumination of these subjects, indications or advertisements.

The apparatus comprises a mirror, which is adapted to rotate about a longitudinal axis, and is carried by a frame moved in such a way as to be always situated normally with respect to the rays of the sun so that once for each revolution of the mirror, or half-revolution if the mirror is a double one, or by oscillation, the luminous rays reflected strike against a fixed mirror, which is conveniently situated for the purpose of throwing the rays to the desired position on to a screen.

Figures 1, 2:
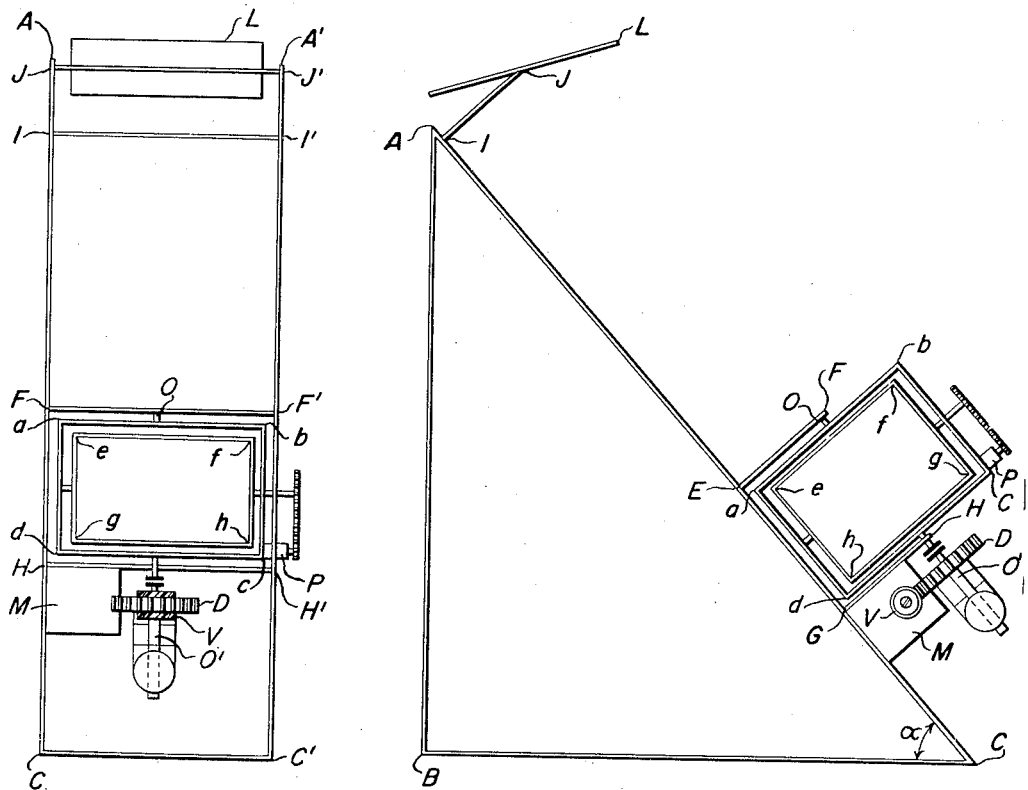
Fig. 1 illustrates diagrammatically an elevational view of the apparatus.
Fig. 2 is a side view corresponding to Fig. 1.

The apparatus illustrated in Figs. 1 and 2 comprises a structure in the form of two right-angled triangles ABC, A'B'C', the angle of which at the base is equal to the latitude of the point of use, and which are connected by cross-pieces, the said structure carrying on arms EFE'F' and HGG'H', which are perpendicular to its hypotenuse and are connected by the transverse members FF' and HH', a rectangular frame abcd turning on a shaft OO' parallel to AC. At the middle of the side portions ad and bc of this frame there are mounted the journal of another internal frame efgh carrying a mirror having two surfaces, or two mirrors placed back to back, to which rotary motion is imparted by an electric motor P.

The frame abcd is integral on its shaft OO', and a toothed wheel D fixed to the shaft is actuated by a worm V, which is itself moved by a clockwork mechanism M in such a manner that the frame described one revolution about OO' in 24 hours in accordance with the apparent movement of the sun.

Two other arms IJI'J' carried by the frame structure support an adjustable but fixed mirror L.

The horizontal line BC being set towards noon and the frame abcd rotated towards the sun, upon each half-revolution of the mirror efgh a luminous beam will be thrown onto the mirror L and reflected to the desired point.

The rotary or oscillatory motion of the mirror efgh is obtained by an electric motor P or an arrangement adapted to maintain or bring about the oscillation, the current being transmitted by the collars on the shaft OO' or by other suitable arrangement.

The circuit passes over a thermal switch described below, which completes the circuit when the sun appears and breaks it when the sun is obscured.

Figure 1A:
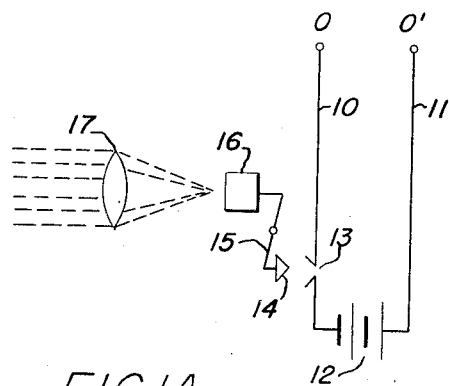
Fig. 1A is a schematic showing of a control circuit for the apparatus.

Fig. 1A illustrates a circuit for controlling the actuation of the motor in response to the sun's rays. The circuit includes a pair of conductors 10 and 11 which terminate at the points O and O' leading to the motor. The circuit contains a source of electric potential shown at 12. The circuit is shown open at 13 and may be closed by means of a contact 14 secured on an arm 15 which may be moved into closing position for the contact 14 by means of a light or heat responsive device 16, which may for instance be a bulb containing a highly volatile liquid adapted to provide an increased gas pressure for the operation of a piston upon exposure to heat. The condenser lens 17 serves to effect a concentration of the sun's rays upon the device 16, and may if desired be also made to follow the sun's course.

The intermittent luminous beam but having a constant direction is used for publicity or advertisements by means of suitable arrangements such as mirrors, prisms, transparencies, illuminated subjects etc.

I claim:

1. Apparatus for intermittently directing solar illumination, comprising a supporting structure having a horizontal portion and an inclined portion forming an angle with said horizontal portion equal to the geographical latitude at the point of use, said horizontal portion being pointed toward noon, a first frame supported on said structure for rotation about an axis forming an angle with the horizontal equal to that of said inclined portion and in a plane parallel thereto, a second frame mounted within said first frame for rotation about an axis perpendicular to the axis of said first frame, a member having at least one light reflecting surface supported by said second frame for rotation therewith, first means for continuously rotating said first frame about its shaft at a speed of one revolution for each twenty-four hours, second means for rotating said second frame and said mirror thereon independently of the rotation of said first frame, and a second mirror mounted on said structure for rotary adjustment about an axis lying in the intersection of a plane parallel to the horizontal with a plane parallel to said inclined portion.

2. Apparatus according to claim 1, wherein said supporting structure includes members forming two parallel right-angled triangles, the hypotenuses of which define the plane of said inclined portion.

3. Apparatus according to claim 1, wherein said first and said second frames each comprise rectangular formations one gimballed within the other.

4. Apparatus according to claim 1, wherein said light reflecting member comprises a two-faced mirror.

5. Apparatus according to claim 1, wherein said second rotating means has an electrical energizing circuit, further including a sun heat responsive circuit controller for said electrical circuit.

JACQUES JOURNEL.

REFERENCES CITED

The following references are of record in the file of this patent:

UNITED STATES PATENTS

| Number | Name | Date |
|---|---|---|
| 59,438 | Morawetz | Nov. 6, 1866 |
| 1,632,254 | Vinogradov | June 14, 1927 |
| 1,938,003 | Arthuys et al. | Dec. 5, 1933 |

FOREIGN PATENTS

| Number | Country | Date |
|---|---|---|
| 326,516 | Germany | Sept. 29, 1920 |